Figure 1:
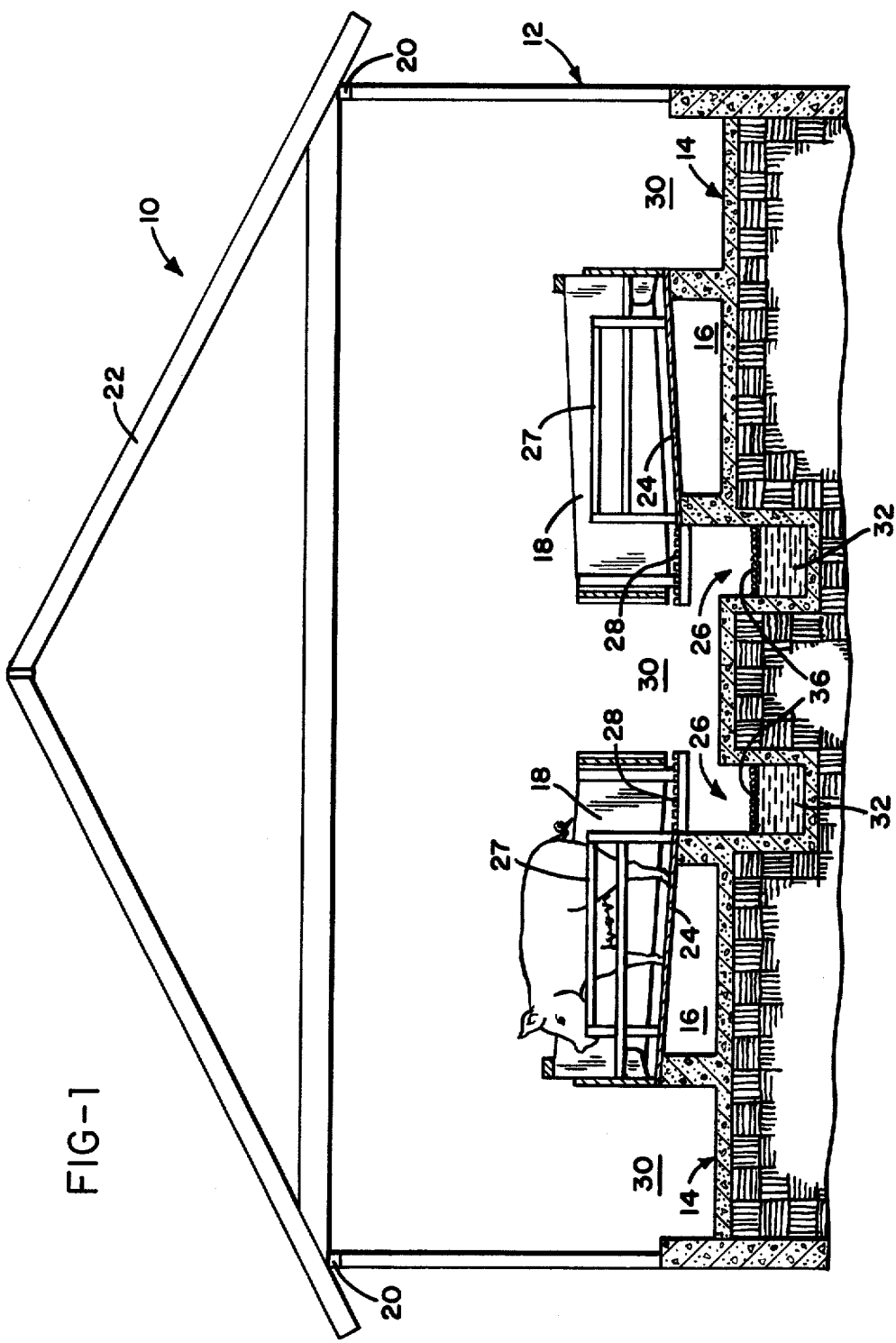

United States Patent
Robinson et al.

[11] 3,884,804
[45] May 20, 1975

[54] METHOD OF DEODORIZING ANIMAL WASTES

[75] Inventors: James V. Robinson, Chillicothe; Larry O. Hill, Frankfort, both of Ohio

[73] Assignee: The Mead Corporation, Dayton, Ohio

[22] Filed: June 29, 1973

[21] Appl. No.: 375,076

[52] U.S. Cl. .......................... 210/64; 21/55; 424/76
[51] Int. Cl. .............................................. C02b 3/06
[58] Field of Search .......... 423/210; 210/63, 64, 36, 210/39, 40, 63; 424/76; 21/55; 119/1

[56] References Cited
UNITED STATES PATENTS

| | | | |
|---|---|---|---|
| 3,113,924 | 12/1963 | Mendius, Jr. ......................... | 210/63 |
| 3,192,156 | 6/1965 | Joyce ............................... | 210/63 X |
| 3,666,405 | 5/1972 | Winsel ............................... | 423/212 X |

Primary Examiner—Thomas G. Wyse
Assistant Examiner—Benoit Castel
Attorney, Agent, or Firm—Biebel, French & Bugg

[57] ABSTRACT

A method of treating animal wastes to reduce odors produced by the decomposition of the organic materials in the animal wastes. Contacogen particles, comprising solid catalyst particles having surface portions which are wetproofed by treatment with a hydrophobic material, are floated on the surface of a watery mass containing the animal wastes. The Contacogen particles promote the oxidation by air of the odoriferous compounds produced by the degenerative breakdown of the animal wastes. In addition, the Contacogen particles are self-renewing in that a portion of them is continually at the air interface where the oxidation takes place. Livestock manure, human sewage, and the like may be treated in this manner wherever present in a contained, open air watery mass.

13 Claims, 2 Drawing Figures

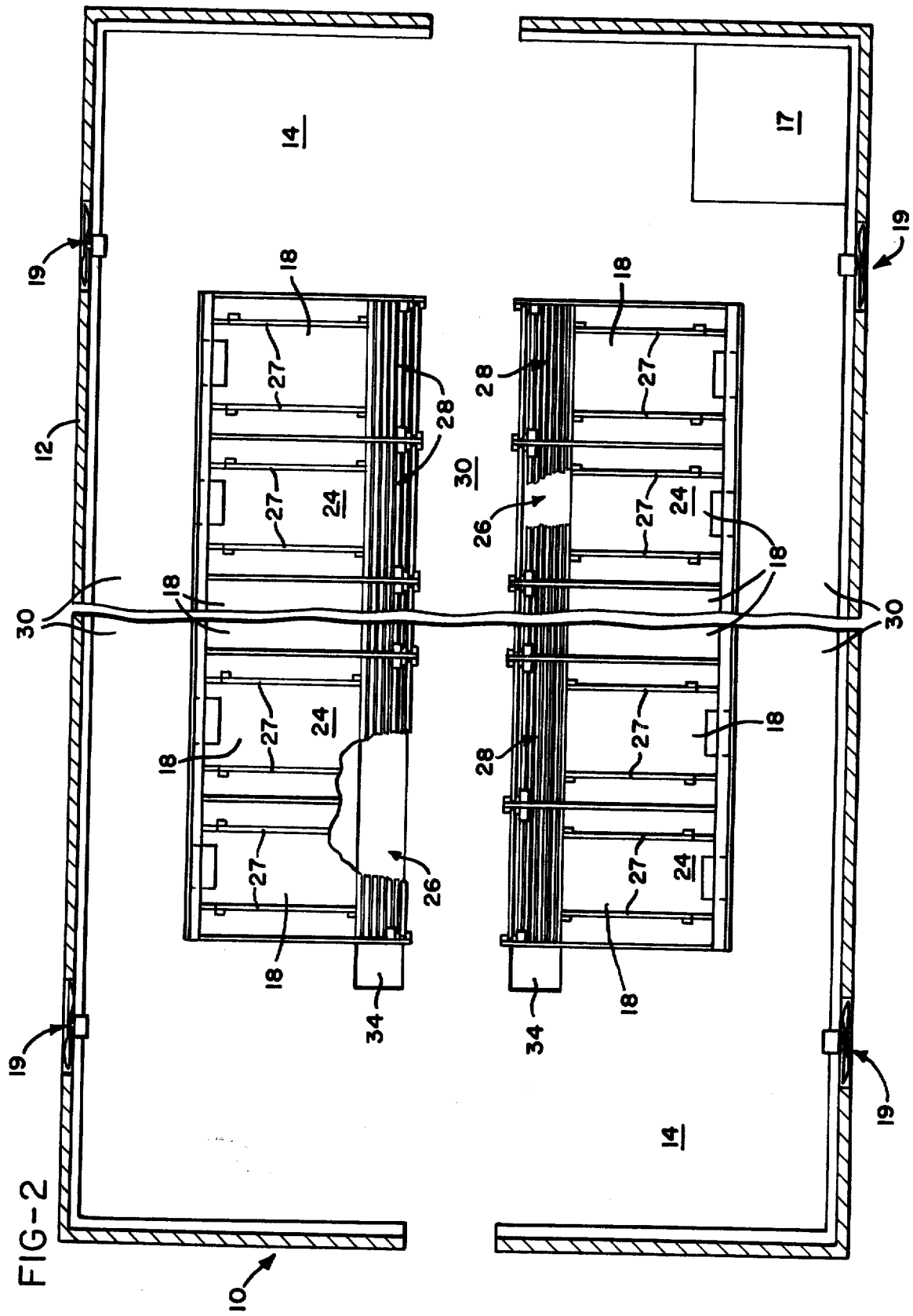

METHOD OF DEODORIZING ANIMAL WASTES

CROSS-REFERENCE TO RELATED APPLICATIONS

Reference is made to copending applications Ser. No. 87,503, filed Nov. 6, 1970 and now abandoned, and Ser. No. 356,469, filed May 2, 1973.

BACKGROUND OF THE INVENTION

This invention relates to the treatment of animal wastes and more particularly to a method of reducing the odors produced by the degenerative breakdown of animal wastes such as livestock (pigs, cattle, chickens, etc.) manure, human sewage, and the like.

An important ecological consideration is the elimination of air pollution caused by odors emanating from human and domestic animals fecal matter and urine. The problems of such odors, even in modern treatment and disposal facilities, is brought into focus by the recent increases in public insistence that air pollution be curbed. Especially offensive are the odor nuisances caused by such operations as human sewage treatment and livestock manure disposal.

In an agricultural aspect, the problem exists because the operation of raising livestock for food creates a vast amount of manure, which manure has a propensity to undergo extremely malodorous natural decomposition. To the extent that such farming operations occur close to residential areas, the need for an efficient treatment process for such agricultural manure is readily apparent. In addition, it is desirable that the treatment process, while deodorizing the waste material, will not create additional pollution hazards.

There are numerous treatments for agricultural manure, many of which are inordinately expensive, and none of which present a quick and efficient elimination of odor without creating additional pollutants. For example, manure deodorants such as masking agents and/or bacterial agents have been used for temporary relief from the odors produced in the ordinary course of farming operations. These treatments are expensive, are not permanent and need frequent applications, and do not actually eliminate the offensive gases but merely cover them up.

Another known treatment process is the use of strong chemical oxidants such as lime water, potassium permanganate, chlorine, ozone, and sodium hypochlorite. While these chemicals are somewhat effective in eliminating odors in enclosed feeding operations, they are often corrosive to the equipment used and are themselves pollutants to the runoff water.

Another treatment which has been suggested is the combustion or high temperature catalytic oxidation of the waste materials. This process is expensive, still involves the necessity for collecting and treating the foul air produced, and is feasible only for very large livestock operations.

Accordingly, the small production units often have to resort to the time-old processes of hauling the manure from enclosed areas, ventilating such areas, and aerating the waste to the extent possible. These operations are time consuming and often do not eliminate the fetid gases but merely distribute them over a larger area.

Catalytic oxidation of polluting gases is, of course, well known. For example in U.S. Pat. No. 3,655,547 there is disclosed an electrochemical means for oxidizing the sulfur dioxide content in flue gases in order to eliminate that source of air pollution. The electrochemical cell has a bipolar electrode system in which the anode and cathode use a porous graphite carbon member which is filled with electrolyte. Anodic products are formed at the anode and cathodic products are formed at the cathode, the face of the carbon member facing each electrode has surface portions coated with a mixture of charcoal and polytetrafluoroethylene, while other surface portions are uncoated. The purpose of treating the surfaces with a hydrophobic substance, such as polytetrafluoroethylene, is to prevent the pore orifices from becoming flooded. While this system may have applicability in a system where the polluting gases are confined in an exhaust stack, it should be apparent that it would not be applicable to the treatment of animal wastes which are collected as a watery mass.

SUMMARY OF THE INVENTION

In accordance with the present invention there is provided a method for treating a watery mass containing animal, including human, wastes in order to reduce the odors produced by the degenerative breakdown of the animal wastes. The treatment method consists of floating Contacogen particles upon the surface of watery excremental or organic waste material. The animal wastes may be restrained in any size or shape of trench, pit, aerating basin, clarifier, pond or lagoon. The Contacogen particles are floated on the surface of the watery mass in such containers in a sufficient quantity such that they would, if undisturbed, make a uniform layer a few grains deep over all of the surface of the watery material. The Contacogen particles are solid catalyst particles which have been treated with a hydrophobic wetproofing agent such as polytetrafluoroethylene (PTFE), silicone resin, and silica colloids made hydrophobic by surface conversion to silicones. The partially wetproofed catalyst particles have a discontinuous coating of the wetproofing agent which does not completely encapsulate the catalyst in an impermeable film.

Since there is a fairly uniform layer of the Contacogen particles covering the surface of the watery mass, this prevents odorous gases given off during the degeneration of the waste material from reaching the surrounding atmosphere. The deodorization probably takes place by reason of the fact that the Contacogen particles first trap the odoriferous compounds formed in and released by the watery mass, trapping being accomplished as by adsorption on the surface of the Contacogen particles. It is believed that in the next step, the Contacogen particles catalytically oxidize the trapped odoriferous materials with oxygen from the air, forming thereby non-odoriferous substances. The products of such oxidation, might, for example, be carbon dioxide, water and nitrogen, formed from amine-type compounds which frequently emanate from naturally decomposed proteinaceous material such as that found in manure and sewage.

In addition, it has been found that the Contacogen particles are self-renewing by virtue of the fact that they float on the surface and if sunk, return to the surface of the watery mass. Thus, the deodorizing ability of the Contacogen particles is preserved since a portion of them are always at the air interface. This means that there is a continuous oxidation of the odoriferous material adsorbed on the active surfaces of the Contacogen particles. It is this oxidation of the fetid gases which reduce the odors emanating from the animal waste. It has been found that the oxidation product, in addition to being odorless, is discharged from the surface of the Contacogen particles, freeing the surface of the Contacogen particles to adsorb more of the odoriferous material.

The ability of the Contacogen particles to remain floating on the surface indefinitely without being lost effectively by sinking to the bottom is a particularly important aspect of the present invention. This is due to the wetproofing treatment of the catalyst particles. The wetproofing agent imparts to areas of the catalyst surface a protection against being wetted by aqueous liquids. A consequence of this non-wetting is that the gas phase will preferentially displace the liquid aqueous phase at the location of the wetproofed material on the surface of the Contacogen, creating there a gaseous bubble which is in effect attached to the surface of the Contacogen. If during the treatment process of the present invention the Contacogen particles should by some combination of circumstances be separated from the gas bubbles which support them at the liquid surface, they will fall to the bottom of the receptacle containing the watery mass. However, the bacterial action inevitably taking place at the bottom of the watery mass will create gas bubbles which by preferentially attaching to the wetproofed areas of the Contacogen surface will carry the particles upward to the air interface at the top of the liquid where the catalyzed oxidation process takes place.

Accordingly, it is an object of the present invention to provide a treatment process for the reduction of odors produced by the decomposition of animal wastes which is continuous in that the partially wetproofed catalyst particles utilized to promote the oxidation of the odoriferous compounds are self-renewing.

Another object of the present invention is to provide a treatment process for the deodorization of livestock manure involving floating Contacogen particles on the surface of a watery mass of the manure.

It is still another object of the present invention to provide a treatment process for reducing air pollution during human sewage treatment by using the Contacogen particles of this invention.

Other objects and advantages of the present invention will be apparent from the following description, the accompanying drawings and the appended claims.

BRIEF DESCRIPTION OF THE DRAWINGS

FIG. 1 illustrates the use of the process of the present invention in a hog farrowing barn; a cross-sectional view of the barn being shown; and FIG. 2 is a floor plan for the farrowing barn of FIG. 1.

DESCRIPTION OF THE PREFERRED EMBODIMENT

The treatment and process of the present invention may be used to prevent odors emanating from animal wastes which are undergoing decomposition. It is believed that the use of Contacogen particles provides a self-renewing means of promoting the oxidation of the odoriferous compounds produced by the degenerative breakdown of the animal wastes. Such compounds include, for example, hydrogen sulfide, ammonia, skatole and diamines such as putrescine and cadaverine.

During the oxidation process these malodorous compounds are transformed to non-odoriferous chemicals.

In addition, the mass of the fecal matter itself is reduced by the treatment process of the present invention. All of the mechanisms and reactions involved are not fully understood, but it is known that a key to the activity is that a portion of the wetproofed catalyst particles are continually at the surface of the watery mass upon which they are floated. Apparently this provides a substance which both traps the odorous gases emanating from the watery mass and at the same time catalytically oxidizes the trapped compounds with oxygen from the air. It is the wetproofing treatment on the catalyst particles which makes it self-renewing, keeps it catalytically active, and prevents it from sinking to the bottom of the watery mass.

One application of the process is to float Contacogen particles on the surface of the watery mass contained in any manure holding receptacle whether a trench, pit, aerating basin, clarifier, pond or lagoon. For example, Contacogen particles may be floated on the surface of the watery mass contained in manure trenches in enclosed livestock areas.

Another example of the embodiment would be to float the Contacogen particles on the surface of a manure holding tank, into which such trenches are discharged. Feeding barns are frequently drained into holding basins so that manure (including fecal matter and urine) leaves the livestock area but accumulates in open pits. Since odors commonly emanate from the wet fecal matter contained in such basins, the need for eliminating such odors is apparent and this may be done by floating Contacogen particles on the surface of such a holding basin.

In addition, commercial livestock operations often utilize manure holding receptacles which are in the form of closed channels, the contents of which are stirred to cause the watery mass to move around the channel, while air is introduced into the watery mass to promote oxidation of the fecal matter. The devices employed to circulate and aerate have many forms, an example being a power driven paddle wheel which accomplishes both functions. Similarly, a power driven impeller is often employed for purposes of circulation, while aeration is accomplished separately by, for example, pumping air into perforated pipes lying on the bottom of the manure containing channel.

The process of the instant invention has utility here also since the Contacogen particles may be floated on the surface of the watery manure in the channel. The presence of the Contacogen particles causes oxidation of the odoriferous compounds produced by the decomposition of the wastes. The action of the paddle wheel does not interfere with the catalytic oxidative ability of the floating Contacogen particles, because the Contacogen particles are not permanently displaceable from the liquid surface by such mechanical disturbance.

It is also possible to use the present invention for the treatment of human excrement in municipal sewage treatment plants. A noticeable source of odor in the municipal sewage plant is the clarifier into which raw sewage is fed to allow material which will do so to settle to the bottom of the clarifier. In accordance with the present invention, Contacogen particles may be floated upon the surface of the primary clarifier to prevent the release of odor from the surface of the clarifier and to decrease fecal content of the material settling to the bottom of the clarifier. Any other place in the sewage disposal plant characterized by the appearance in the open of the watery mass of sewage exposed to air would be an appropriate place for the practice of this invention by floating on the exposed surface the partially wetproofed catalyst particles.

The catalyst particles may be any substance presenting a large specific surface area which has the property of catalyzing the oxidation by air of the odoriferous compounds produced by the degenerative breakdown of animal wastes. Activated carbon is such a catalyst. Carbon and activated carbon appear to provide optimum performance because of the relatively large surface area-to-weight ratio, because it is non-toxic should it be eaten by the livestock, and because it is easily finely divided. Moreover, this is a readily available material which may be obtained in a wide variety of particle sizes and surface areas. Typical of the carbons useable in accordance with the present invention are carbon black, furnace black, channel black or carbons prepared by known procedures from various sources, for example, wood, corn cobs, beans, nut shells, bagasse, lignin, coals, tar, petroleum residues, bones, peat and other carbonaceous materials.

The particle size may vary from about 10 microns, for a powder, to relatively large size granules, e.g., about one centimeter, and usually the carbon is supplied as a mixture of granules of various particle sizes. The surface area of the carbonaceous material may vary from about 300 square meters per gram to about 1,400 square meters per gram, as characterized by gaseous adsorption using the BET method. For example, suitable activated carbons may be BPL or SGL manufactured by Pittsburgh Activated Carbon Corporation.

The catalytic base is wetproofed by a treatment which results in the deposition of a substance of low surface energy as a discontinuous film upon the catalytic substrate. The wetproofing treatment of the Contacogen particles may be as described in copending applications Ser. No. 87,503 and Ser. No. 356,469. Suitable materials for accomplishing the wetproofing of Contacogens for the purpose of this invention are such hydrophobic materials as polytetrafluoroethylene (PTFE), silicone resins and silica colloids made hydrophobic by surface conversion to silicones.

For example, carbon particles may be wetproofed with polytetrafluoroethylene by intermixing the particles with the PTFE in emulsion form. The mixture is heated to remove the vehicle and dispersing agent for the PTFE. It has been found that PTFE, in amounts of between 1% to 30% by weight of the carbon particles, may be used without complete encapsulation of the carbon particles. Likewise, polyethylene may be used as a wetproofing agent.

Likewise, hydrophobic fumed silicon dioxide in combination with silicone resin may be used for the wetproofing agent. For example, granular activated carbon may be treated with hydrophobic silicon dioxide in the proportion of 3 percent on the weight of the carbon, and additionally, with silicone resin in the proportion of 0.6 percent on the weight of the carbon. The hydrophobic silicon dioxide, dispersed in isopropanol in the proportion of 3 percent of the weight of isopropanol, is mixed with the silicone resin dissolved in toluene in the proportion of 4 percent of the weight of toluene, and the granular carbon is added to this combined mixture and stirred. After treatment, the granular carbon is dried in an oven at 150°C. for from 3 to 5 hours. The hydrophobic silicon dioxide may be "Silanox 101" manufactured by the Cabot Corporation, and the silicone resin may be Resin 282 manufactured by the Dow Corning Corporation.

The purpose of the wetproofing agent is to prevent the liquids present in the watery mass of animal wastes from completely wetting or flooding the Contacogen particles. Wetted, as used here, means that the contact angle between the Contacogen and the principal liquid is low, e.g., less than about 90° and approaching zero. The wetproofing agents, on the other hand, present areas on the surface of the catalyst which are not wetted by the liquids present, i.e., the contact angle between the areas coated with a wetproofing agent and the liquid is greater than about 90°. Thusly, the wetproofing agent on the surface of the catalyst, with a lower surface energy than the liquids present in the watery mass, lowers the surface energy of the areas of the solid catalyst coated with the wetproofing agent to a surface energy less than that of the liquid which would otherwise completely wet the catalyst. A completely wet or flooded catalyst particle would sink to the bottom of the liquid of the watery mass of animal waste. However, a wetproofed catalyst will not.

This is due to the presence of a wetproofing on areas of the catalyst surface. In addition to merely being nonwettable by the liquid phase, the wetproofed areas provide sites where a gas phase will preferentially displace the liquid. The gas bubbles which thus become attached to the Contacogen particles not only helps keep the Contacogen particles afloat but provides a means for raising any particles which are sunk under the weight of the fecal matter.

This means that the Contacogen particles are self-renewing to the extent that a single application of particles to the surface of a watery mass will continue to promote oxidation and reduce the odors for a considerable period of time up to several months duration or longer. For example, one batch of Contacogen particles deodorized a twenty sow farrowing barn for the whole farrowing period of nearly two months and, even then, showed no signs of decreased activity.

EXAMPLE 1

A sample of hog manure from a farming operation was brought into the laboratory in a polyethylene bag. The experiment consisted of placing equal portions of the hog manure into two one-liter glass beakers, which were placed in a fume-exhaust hood. On one of the beakers was spread a layer of Contacogen, which floated, making a depth of about ¼-inch. The Contacogen consisted of an activated carbon, 8 × 30 mesh grain size, treated with a PTFE emulsion and dried, to leave a deposit of about 5% by weight of the PTFE on the carbon.

The beakers containing the hog manure were inspected several times a week over a period of about four weeks, during which time the water content gradually evaporated, finally leaving a dry deposit. the critical observation was simply to smell the beakers. Throughout the entire period, the odor from the uncovered hog manure was nauseating and unbearable. By contrast, the odor from the hog manure on which the layer of Contacogen particles was floating was very faint. The nature of the odor was unchanged, as unpleasant as before, but so diminished in intensity that a close approach to the beaker and a sizable whiff were required before anything could be detected. The floating Contacogen particles, when stirred under the surface of the manure sludge, agitated, and repeatedly covered with manure, continued to be effective in suppressing the odor, and maintained a buoyancy that kept them near the surface. However, most of the grains of Contacogen material were invisible from the top, but easily could be found near the surface with a probe.

EXAMPLE 2

On a different occasion from that described in Example 1, another sample of hog manure from a farming operation was brought into the laboratory. Into each of three 600 cc. glass beakers were placed about 400 cc. of watery hog manure. To one beaker was added 15 grams of wetproofed Contacogen, like that described in Example 1. To another beaker was added 15 grams of 8 × 30 mesh activated carbon, without wetproofing, being the same type of carbon from which the wetproofed Contacogen was prepared. The third beaker was left without additive. The three beakers were placed in a fume exhaust hood and left there. Four days later, the hog manure without additive had a very strong and unpleasant odor. The beaker with the activated carbon additive was indistinguishable from that with no additive. The beaker with the wetproofed Contacogen had only a faint odor, and this odor was much more agreeable than the odor from the other two beakers. Five weeks after the start of the experiment, the water had evaporated, and each beaker had in it a large black residue. The odor of the beaker containing activated carbon additive had a strong and unpleasant odor, but it was noticeably less pungent than was the beaker without additive. The odor of the beaker containing the wetproofed carbon additive was faint, fruity, and not unpleasant.

EXAMPLE 3

This example demonstrates the use of the process of the present invention in a commercial pig-producing unit. Referring to FIG. 1, there is shown a farrowing barn 10 consisting of a frame building 12 with a concrete floor 14. Heating ducts 16, heated by furnace 17 (see FIG. 2), pass under and form the floor of the pens 18. In addition, ventilation in the building 12 is provided by exhaust fans at areas 19 in the wall of building 12 (see FIG. 2), drawing air through slots 20 around the eaves of roof 22. The floors 24 of pens 18 are raised above the concrete floor 14 and are slanted so that they drain into trenches 26 which are covered with steel gratings 28. As shown in FIG. 2, trenches 26 run lengthwise in the center of building 12 with pens 18 to the outside. Aisles 30 are located on each side of the pens 18.

The farrowing barn is designed so that the sows can farrow without much attention. Rails 27 confine the sows in place and protect the pigs from being trampled by the sows. Under such a setup the pigs can be left with the sows in pens 18 until weaning time. Manure falls into trenches 26 from the slanted floors 24 of pens 18. With only occasional washing of the floors 24 of pens 18, the manure is kept well contained in trenches 26. Trenches 26 are filled with water 32 to a level maintained by an automatic siphon 34 (see FIG. 2) at the end of each trench. The siphon 34 delivers the trench overflow to a receiving tank (not shown) outside of building 12. After each weaning, the sows and pigs are removed from the building and the accumulated manure in the trenches is flushed with water and pumped out.

At the time of this experiment, the owner and operator was finding this farrowing barn 10 a marginal success. Odor from the manure trenches 26 made the building almost unapproachable for the necessary daily feeding and inspection. In addition, the health of the animals was bad. The pigs especially were intermittently threatened by scours, apathy, staggering gait, attacks of muscual tremors, coughing and respiratory ailments. The remedy for the symptoms was to increase the ventilation of building 12 to such an extent that maintaining the necessary warmth was difficult and required excessive consumption of fuel gas in the heaters.

This experiment began just before a batch of sows were due to be put into the pens for farrowing. The manure trenches 26 were filled with water 32 and on top of the water 32 was floated 42 pounds of wetproofed Contacogen particles 36. The Contacogen particles 36 consisted of a base of 8 × 30 mesh activated carbon treated with 3%, by weight of the carbon, of a silicone-surfaced fumed silica and 0.6%, by weight of the carbon, of silicone resin. The 42 pounds were calculated to cover the surface of the two trenches 26, each 50 feet long by 1.25 feet wide, with a floating layer of Contacogen particles 36 approximately three grains deep.

Observations were made over a six weeks period, that is, the time for one batch of fifteen sows to farrow and to bring 120 pigs almost to weaning age. The odor of the interior of building 12 during the six weeks was pleasant, smelling of animals but with no odor of putrescence or excrescence. The odor of the air immediately above manure trenches 26 was no different from the air in the rest of the building. The attitude of the animals was spectacularly different from those of the operator's previous experience in this building in that they were alert, active, well coordinated and free of scours, coughing and respiratory ailments.

During the experiment manure was observed on the floating layer of Contacogen particles 36, sometimes to a maximum depth of perhaps an inch. The accumulation of the manure on the surface was self-clearing. That is, it did not continue to build-up after the thickness reached a certain maximum. It is believed that when the thickness became more than the buoyancy of the Contacogen particles 36 could support, the layer sank and in doing so, in consequence of the motion of the solid material through the water substrate 32, Contacogen particles 36 with their attached bubbles of gas, were separated from the more dense material. The gas bubbles attached to Contacogen particles 36 raised them back into the surface of the liquid while the heavier material went to the bottom. In addition, it was found that the sediment on the bottom of trenches 26 was less than that found when no Contacogen particles were used. It appears that the action induced by Contacogen particles 36 at the water surface of manure trench 26 caused the disappearance of much of the fecal matter by the catalytic oxidation thereof.

After weaning, the sows and pigs were removed from building 12 and the accumulated manure in trenches 26 was flushed with water and pumped out into a receiving tank (not shown). From there the sludge may be spread as a fertilizer on the fields. The presence of Contacogen particles which are non-toxic and nonpolluting does not present any particular problem to the use of the residue as a fertilizer.

The concept of the present invention is applicable to the treatment of any kind of fecal or similar organic matter which is in a watery mass and which is exposed to air. Examples have been given to the treatment of manure from pig raising operations. Similar treatments are efficacious in the suppression of odors from the manure of other livestock raising operations. The origin of the fecal matter is not important since all fecal matter has the common characteristic of being composed of a proteinaceous material and of material derived from the degenerative breakdown of the proteinaceous material. It is the compounds derived from the degenerative breakdown of the animal wastes which constitute the malodorous compounds.

Another significant and highly objectionable, but non-odorous, product from the anaerobic breakdown of fecal matter is carbon monoxide. It is believed that the treatment process of the present invention also eliminates the production of carbon monoxide. For example, the staggering gait and muscular tremors observed in the pigs in previous experiments, but not those of Example 3, indicates that carbon monoxide may have been present when Contacogen particles were not used but was absent when Contacogen particles were used.

The treatment process of the instant invention may be used in the treatment of animal wastes, either human sewage or livestock manure wherever noxious and odoriferous gases escape from the watery mass of animal waste exposed to the air.

While the methods herein described constitute preferred embodiments of the invention, it is to be understood that the invention is not limited to these precise methods, and that changes may be made therein without departing from the scope of the invention.

What is claimed is:

1. A method of treating animal wastes to reduce the odors produced by the degenerative breakdown of said animal wastes comprising floating on the surface of a watery mass of said animal wastes solid catalyst particles selected from the group consisting of carbon and activated carbon particles having surface portions of a hydrophobic material which forms a discontinuous film thereon, said hydrophobic material selected from the group consisting of polytetrafluoroethylene, silicone resins and silica colloids made hydrophobic by surface conversion to silicone.

2. A method of treating animal wastes as set forth in claim 1 wherein said catalyst particles are activated carbon particles treated with a silicone material.

3. A method of treating animal wastes as set forth in claim 2 wherein said silicone material is 3%, by weight of the carbon, of a silicone-surfaced fumed silica and 0.6% by weight of the carbon, of silicone resin.

4. A method of treating animal wastes as set forth in claim 1 wherein said watery mass is present in a manure holding receptacle.

5. A method of treating animal wastes as set forth in claim 4 wherein said manure holding receptacle has a means for circulating and aerating the watery mass of said animal wastes.

6. A method of treating animal wastes as set forth in claim 1 wherein said animal wastes are human sewage.

7. A method of treating animal wastes as set forth in claim 6 wherein said catalyst particles are floated upon the surface of the primary clarifier of a sewage disposal plant.

8. A method of treating animal wastes as set forth in claim 1 wherein said animal wastes are livestock manure.

9. A method of treating animal wastes as set forth in claim 8 wherein said livestock manure is hog manure and the watery mass of hog manure is contained in manure trenches.

10. A method of treating hog manure to reduce the odors produced by the degenerative breakdown of said hog manure comprising:
  a. collecting said hog manure, including the fecal matter and urine, in a trench which is partially filled with water,
  b. floating on the surface of the watery mass in said trench solid catalyst particles selected from the group consisting of carbon and activated carbon particles having surface portions of a hydrophobic material which forms a discontinuous film thereon, said hydrophobic material selected from the group consisting of polytetrafluoroethylene, silicone resins and silica colloids made hydrophobic by surface conversion to silicone, and
  c. periodically flushing said trenches.

11. A method of treating hog manure as set forth in claim 10 wherein said catalyst particles are treated with a silicone material.

12. A method of treating hog manure as set forth in claim 11 wherein said silicone material is 3%, by weight of the carbon, of a silicone-surfaced fumed silica and 0.6%, by weight of the carbon, of silicone resin.

13. A method of treating hog manure as set forth in claim 12 wherein said carbon particles are 8 × 30 mesh activated carbon particles.

* * * * *